(12) United States Patent
Brammeier et al.

(10) Patent No.: US 11,154,013 B2
(45) Date of Patent: Oct. 26, 2021

(54) RAIL INTERRUPTER

(71) Applicant: DEERE & COMPANY, Moline, IL (US)

(72) Inventors: Tyler S. Brammeier, East Moline, IL (US); Michael T. Meschke, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 235 days.

(21) Appl. No.: 16/454,315

(22) Filed: Jun. 27, 2019

(65) Prior Publication Data
US 2020/0404850 A1 Dec. 31, 2020

(51) Int. Cl.
A01F 12/30 (2006.01)
A01F 12/40 (2006.01)

(52) U.S. Cl.
CPC .......... *A01F 12/305* (2013.01); *A01F 12/40* (2013.01)

(58) Field of Classification Search
CPC ........ A01F 12/305; A01F 12/40; A01F 7/067; A01F 12/181; A01F 12/28; A01F 12/46; A01F 12/00; A01D 41/02; A01D 75/00; A01D 41/12
See application file for complete search history.

(56) References Cited

U.S. PATENT DOCUMENTS

| | | | | |
|---|---|---|---|---|
| 755,152 A | * | 3/1904 | Mishler | A01F 12/28 460/109 |
| 861,189 A | * | 7/1907 | Koger | A23N 5/01 460/141 |
| 923,221 A | * | 6/1909 | Wallschlaeger | A01F 12/24 460/110 |
| 952,795 A | * | 3/1910 | Flynn | A01F 12/24 460/110 |
| 2,159,664 A | * | 5/1939 | Lindgren | A01F 12/24 460/71 |
| 2,457,259 A | * | 12/1948 | Moll | A01F 12/24 460/110 |
| 3,678,938 A | * | 7/1972 | De Coene | A01F 12/442 460/73 |
| 4,266,393 A | * | 5/1981 | Taylor | A01F 11/00 460/107 |
| 5,542,883 A | * | 8/1996 | Cruson | A01F 12/40 460/112 |
| 5,569,080 A | | 10/1996 | Estes | |
| 7,484,350 B2 | * | 2/2009 | Benes | A01F 12/40 56/504 |
| 7,510,472 B1 | * | 3/2009 | Farley | A01D 90/04 460/112 |
| 7,544,127 B2 | * | 6/2009 | Dow | A01F 12/40 460/112 |

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A rotor assembly for harvesting a crop. The rotor assembly has a rotating portion defined along a rotation axis, a surrounding assembly at least partially surrounding the rotating portion, the surrounding assembly having at least one separation grate coupled to a support. The support defines an inner surface and has at least one interrupter receiver. The at least one interrupter receiver is selectively coupleable to an interrupter to position the interrupter radially inward of the inner surface towards the rotation axis.

20 Claims, 7 Drawing Sheets

(56) References Cited

U.S. PATENT DOCUMENTS

| | | | | |
|---|---|---|---|---|
| 9,707,565 B2* | 7/2017 | Lyne, II | ............... | B02C 18/2216 |
| 2008/0293461 A1* | 11/2008 | Benes | ..................... | A01F 12/40 |
| | | | | 460/112 |
| 2014/0087793 A1* | 3/2014 | Regier | ................... | A01F 12/22 |
| | | | | 460/59 |
| 2015/0250101 A1* | 9/2015 | Kile | ....................... | A01D 41/12 |
| | | | | 460/108 |
| 2016/0295802 A1* | 10/2016 | De Witte | ................ | A01F 12/26 |
| 2017/0164559 A1* | 6/2017 | Matousek | .............. | A01F 7/062 |

* cited by examiner

RAIL INTERRUPTER

FIELD OF THE DISCLOSURE

The present disclosure relates generally to an interrupter, and more specifically to an interrupter positioned on a crop processing arrangement for an axial rotary agricultural combine.

BACKGROUND

Many work machines, and in particular work machines designed to harvest a crop, utilize a rotating assembly to separate grain or the like from the remaining plant debris such as leaves, stalks, and stems. The rotating assembly is often formed from a substantially hollow drum with a rotor that rotates therein. As the rotor rotates, any crop and debris positioned within the hollow drum is agitated and moved axially towards the rear of the rotating assembly which often has a separating section. As the rotor separates the grain from the remaining debris, the grain falls through grates or the like along a lower portion of the rotating assembly. Once the grain is separated, it is further processed and temporarily stored in a tank of the work machine.

The rotating assembly often has a support structure extending longitudinally along each side of the rotating assembly. The support structure provides a location to couple the grates along the lower portion of the rotating assembly and cover elements over the upper portion of the rotating assembly. When the grates and cover elements are coupled to the support structure they form a substantially cylindrical cavity within which a drum rotates. The capacity of the rotating assembly depends on how efficiently the rotating assembly can separate the grain from the remaining plant debris. Crop conditions and crop type, among other things, affects the capacity of the rotating assembly. Accordingly, it is advantageous to have a rotating assembly that has a high capacity and is adjustable to different crop conditions and types.

SUMMARY

One embodiment is a rotor assembly for harvesting a crop. The rotor assembly has a rotating portion defined along a rotation axis, a surrounding assembly at least partially surrounding the rotating portion, the surrounding assembly having at least one separation grate coupled to a support. The support defines an inner surface and has at least one interrupter receiver. The at least one interrupter receiver is selectively coupleable to an interrupter to position the interrupter radially inward of the inner surface towards the rotation axis.

In one example of this embodiment, the at least one interrupter receiver includes a slot defined through the support, wherein the interrupter extends through the slot. In another example, the interrupter has an interrupter length that defines the distance which the interrupter extends from the inner surface towards the rotating portion, the interrupter length being variable. In one aspect of this example, the at least one interrupter receiver is sized to receive a plurality of interrupter types, wherein the plurality interrupter types each have different interrupter lengths.

In another example of this embodiment, the interrupter is a square stock defined longitudinally along at least a portion of the support. In another example, the interrupter is a round bar defined longitudinally along at least a portion of the support. In yet another example, the interrupter is a tine extending from the support towards the rotating portion. In another example, the interrupter has a triangular or conical side profile.

In yet another example, the interrupter is selectively coupled to the at least one interrupter receiver to reposition the interrupter between a limited exposure position wherein the interrupter does not extend past the inner surface of the support towards the rotating portion and a full exposure position wherein the interrupter extends past the inner surface towards the rotating portion. In one aspect of this example, the interrupter is repositionable between the limited exposure position and the full exposure position through an electronic user interface.

In another aspect of this example, the interrupter is repositionable between the no exposure position and the full exposure position through a mechanical adjustment.

Another embodiment is a harvested crop processing arrangement. The harvested crop processing arrangement has a support rail defining an inner surface, at least one grate coupled to the support rail at least partially about a rotation axis, and an interrupter coupled to the support rail. The interrupter is coupleable to the support rail in a first orientation where at least a portion of the interrupter extends radially inward towards the rotation axis and past the inner surface of the support rail.

In one example of this embodiment, the interrupter is coupleable to the support rail in a second orientation where the interrupter does not extend substantially radially inward towards the rotation axis past the inner surface. In another example, the interrupter has a leading face that is substantially perpendicular to the inner surface when the interrupter is in the first orientation. In one aspect of this example, the interrupter has a trailing profile that extends from the leading face to the inner surface, wherein the trailing profile is not perpendicular to the inner surface.

In another example, the interrupter is pivotally coupled to the support rail and comprises a solenoid that selectively repositions the interrupter between the first orientation and a second orientation.

Another embodiment is a crop harvesting machine that has at least one ground engaging mechanism coupled to a frame, a cutting head coupled to the frame and configured to cut crop from an underlying surface, a crop processing arrangement coupled to the frame through a plurality of support sections. The crop processing arrangement further having a rail with a top side, bottom side, inner surface, and outer surface, the rail extending between two adjacent support sections, a cover coupled to the rail along the top side of the rail, a grate coupled to the rail along the bottom side of the rail, a rotor rotationally coupled to the crop harvesting machine along a rotation axis and positioned at least partially between the cover and the grate, and a first interrupter group coupled to the rail between the top side and the bottom side, the first interrupter group defining at least one interrupter. The first interrupter group is coupleable to the rail in a first orientation to position the at least one interrupter through a first slot in the rail to extend radially inward towards the rotation axis past the inner surface.

One example of this embodiment is a second interrupter group coupled to the rail between the top side and the bottom side, the second interrupter group defining at least one interrupter. The second interrupter group is coupleable to the rail in the first orientation to position the at least one interrupter through a second slot in the rail to extend radially inward towards the rotation axis past the inner surface. Both the first interrupter group and the second interrupter group are also coupleable to the rail in a second orientation where none of the at least one interrupters are positioned through the corresponding first or second slot when the corresponding first or second interrupter group is in the second orientation. In one example of this embodiment, the first interrupter group is coupleable to the rail in the first orientation while the second interrupter group is coupled to the rail in the second orientation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
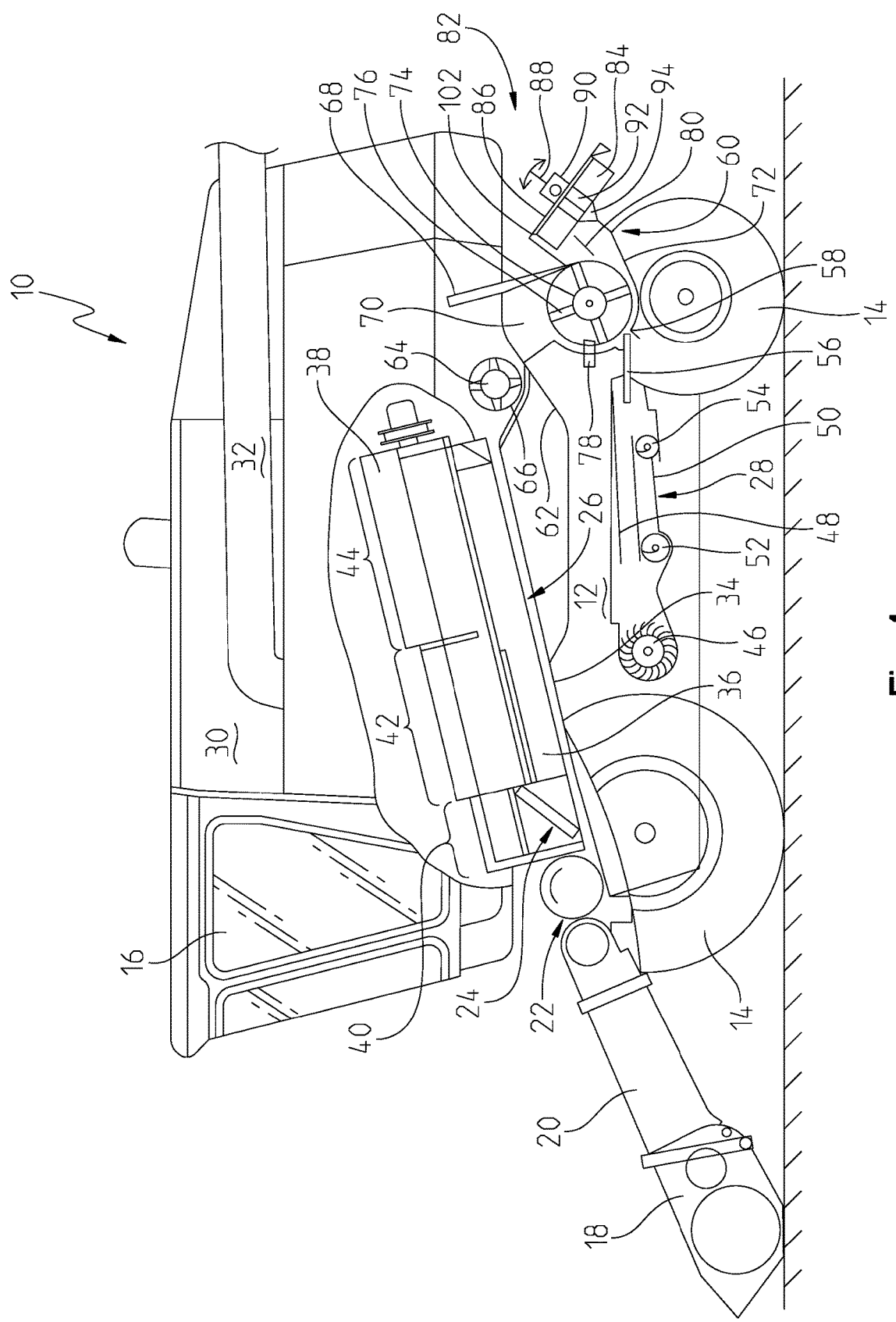
FIG. 1 is a side view of a crop harvesting machine.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an embodiment of a harvester or agricultural combine 10 is shown with a chassis or frame 12 with one or more ground engaging mechanism such as wheels 14 which are in contact with the underlying surface or ground. Wheels 14 are coupled to the frame 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls for controlling the operation of the combine 10. A cutting head 18 is disposed at a forward end of the combine 10 and is used in order to harvest crop such as corn and to conduct it to a slope conveyor 20. The harvested crop is conducted by a guide drum 22 from the slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26.

Corn, chaff, and the like that fall through a thresher basket associated with the threshing section 42 and through a separating grate associated with the separating section 44 may be directed to a clean crop routing assembly 28 with a blower 46 and sieves 48, 50 with louvers. The sieves 48, 50 can be oscillated in a fore-and-aft direction. The clean crop routing assembly 28 removes the chaff and guides the clean corn over a screw conveyor 52 to an elevator for clean corn. The elevator for clean corn deposits the clean corn in a corn tank 30, as shown in FIG. 1. The clean corn in the corn tank 30 can be unloaded by means of an unloading screw conveyor 32 to a corn wagon, trailer, or truck. Harvested crop remaining at the lower end of the lower sieve 50 is again transported to the harvested crop processing arrangement 26 by a screw conveyor 54 and an overhead conveyor. The harvested crop residue delivered at the upper end of the upper sieve 48 that consist essentially of chaff and small straw particles may be conveyed by means of an oscillating sheet conveyor 56 to the rear and to a lower inlet 58 of a crop debris routing assembly 60.

The aforementioned blower 46 produces an air flow that carries much of the chaff and small particles to the rear of the combine and to the crop debris routing assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and Material Other than Grain (hereinafter "MOG") is directed through the clean crop routing assembly 28. A wall 68 is located to the rear of the ejection drum 64. The wall 68 guides the straw into an upper inlet 70 of the crop debris routing assembly 60.

The crop debris routing assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the crop debris routing assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the crop debris routing assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

Figure 2:
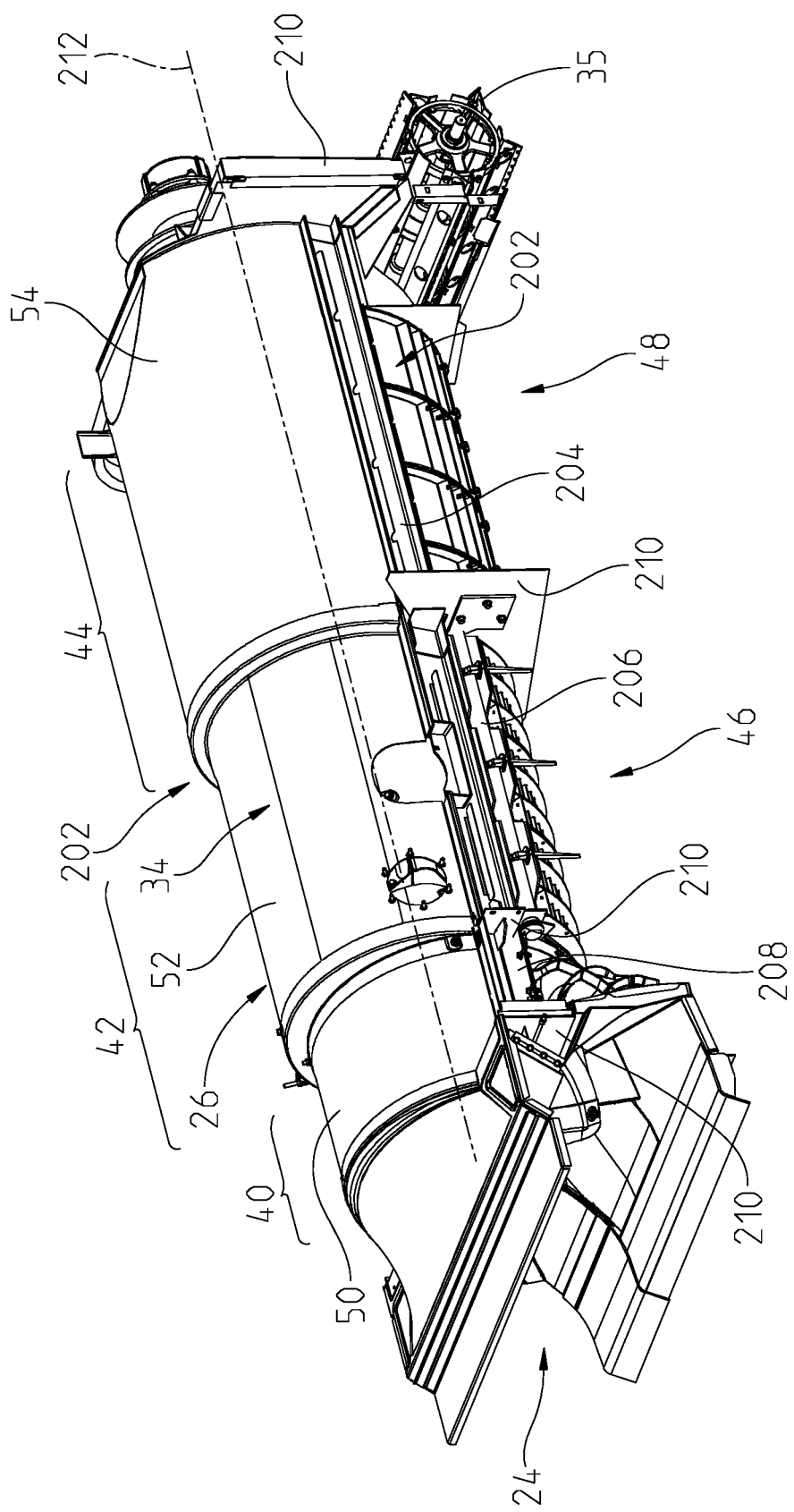
FIG. 2 is an elevated perspective view of a housing for a harvested crop processing unit.

Referring now to FIG. 2, one non-exclusive example of the harvested crop processing arrangement 26 removed from the combine 10 is illustrated. More specifically, one embodiment of a surrounding assembly 214 is illustrated defined along a rotation axis 212. Further, a support rail 202 is illustrated extending longitudinally along harvested crop processing arrangement 26. The support rail 202 may provide structural stability to the harvested crop processing arrangement 26 and couple the crop processing arrangement 26 to the combine 10. Further, the support rail 202 may generally provide locations for cover elements 50, 52, 54 to be coupled thereto along an upper portion and grate elements 46, 48 to be coupled thereto at a lower portion of the support rail 202. The cover elements 50, 52, 54 and the grate elements 46, 48 may be coupled to the support rail 202 to define a cylindrical cavity along the rotation axis 212 in which the rotor 36 may be positioned.

While only one support rail 202 is visible in FIG. 2, a second support rail 202 may also be positioned on the opposite side of the crop processing arrangement 26 and extend longitudinally there along similarly as the visible support rail 202. Further, the support rail 202 may actually be a plurality of rails. For example, the support rails may include a separating rail section 204, a threshing rail section 206, and a charging rail section 208. Each rail section 204, 206, 208 may extend between support sections 210 of the combine 10. The support sections 210 may be any portioned of the combine 10 that is structurally supported by the frame 12, either directly or through additional components.

While a specific configuration of the support rail 202 is shown and described with reference to FIG. 2, this disclosure contemplates implementing the teachings discussed herein with any type of support rail. More specifically, any type of supporting member that runs at least partially longitudinally along the harvested crop processing arrangement 26 may utilize the teachings discussed herein. Accordingly, the example of FIG. 2 is not considered exclusive.

Figure 3:
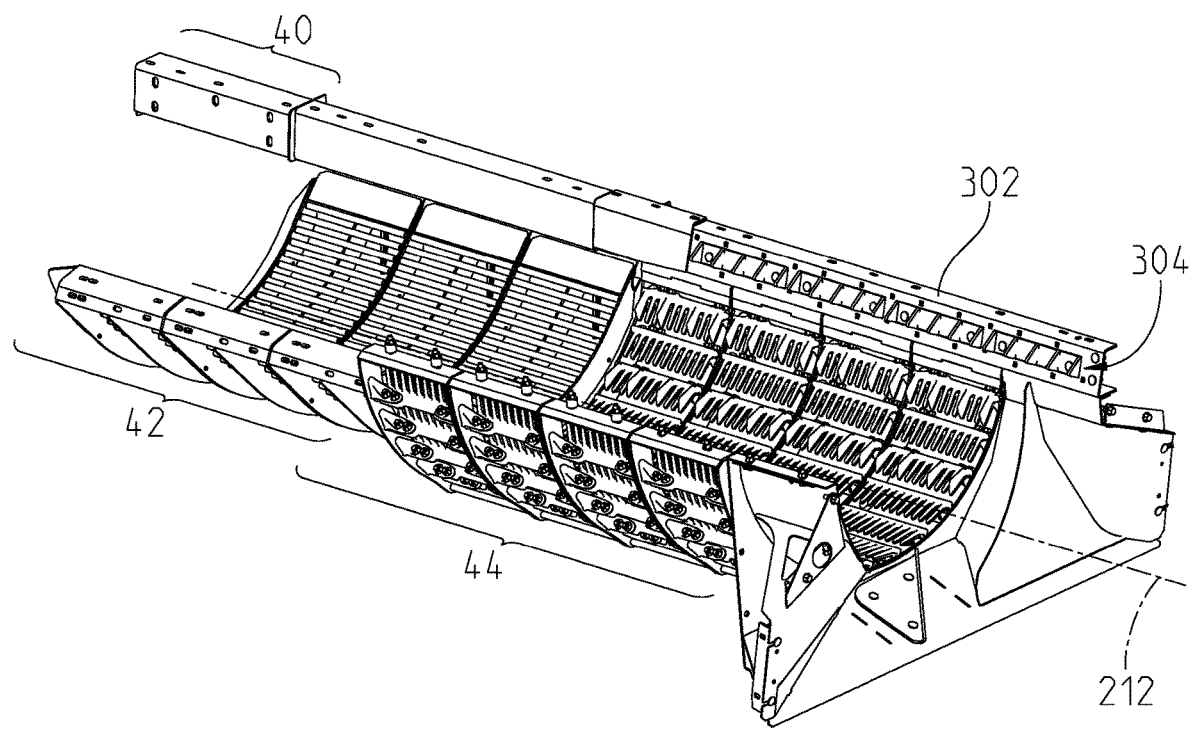
FIG. 3 is a section view of one embodiment of the harvested crop processing unit of FIG. 2.

Referring now to FIG. 3, an isolated view of a support rail 302 coupled to grates 48, 46 is illustrated with the cover elements 50, 52, 54 removed. In the embodiment of FIG. 3, a plurality of interrupters 304 are coupled to the support rail 302. The interrupters 304 may extend radially inwardly from the support rail 302 to contact any crop material positioned therein as the rotor 36 rotates. More specifically, one objective of the crop processing arrangement is to separate the grain from the MOG quickly and efficiently. The interrupters 304 may extend sufficiently into the crop processing arrangement 26 to agitate the crop material as it passes there along to thereby further dislodge any grain material.

In the embodiment of FIG. 3, the interrupters 304 are positioned only along the separating section 44. However, this disclosure also contemplates implementing the teachings discussed herein along the threshing section 42 and the charging section 40 as well. Accordingly, while not specifically illustrated, this disclosure also contemplates positioning interrupters along the charging and threshing sections 40, 42 as well.

Figure 4:
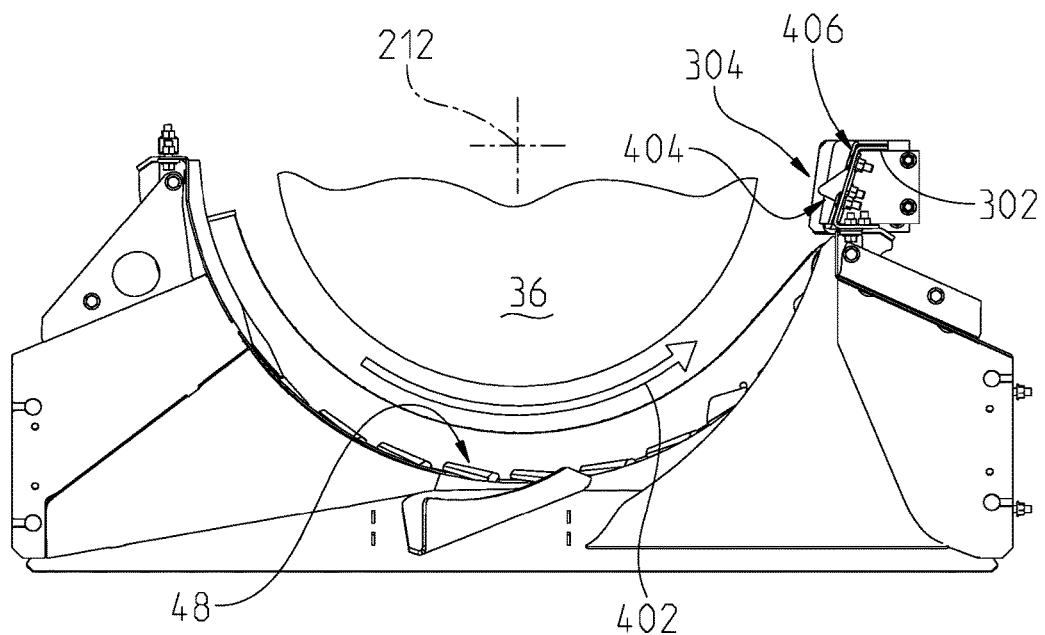
FIG. 4 is a partial section view of the crop processing unit of FIG. 3 with a rotor positioned therein.

FIG. 4 illustrates a back view of the embodiment of FIG. 3 with an exemplary rotor 36 illustrated therein. The in the embodiment of FIG. 4, the rotor 36 may rotate in a counterclockwise direction 402. Further, the interrupters 304 may have a leading face 404 that is about perpendicular to an inner surface 406 of the support rail 302. In this configuration, as the rotor 36 moves the crop in the counterclockwise direction 402, it may contact the leading face 404 of the interrupter 304 to thereby further agitate the crop to dislodge grain positioned therein. The dislodged grain may then fall towards and through the separating grate 48 to be further processed by the combine 10.

Figure 5:
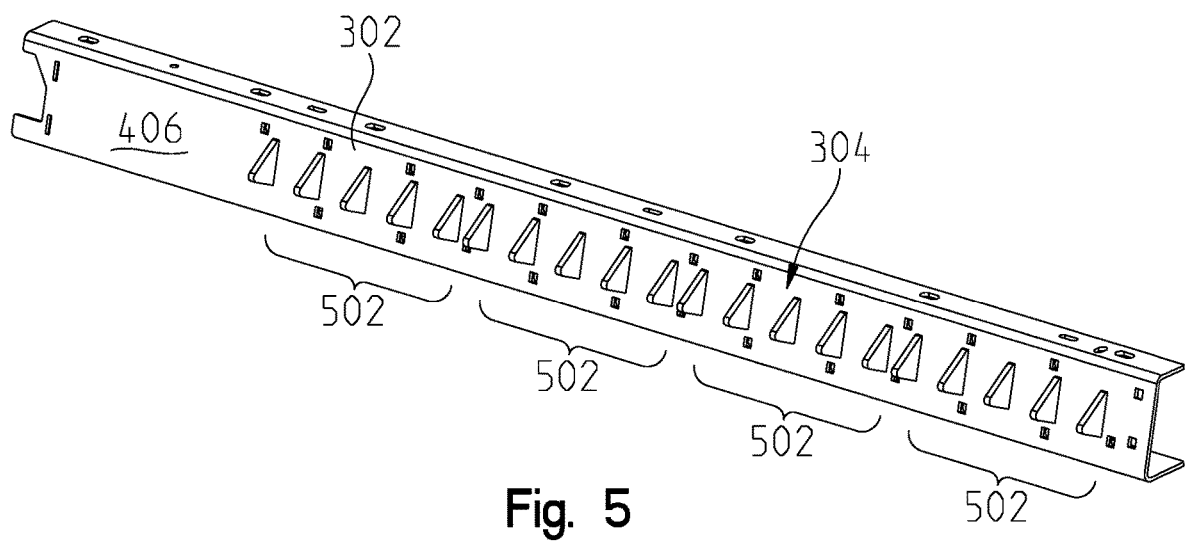
FIG. 5 is an elevated perspective view of a support rail having a plurality of interrupters positioned thereon.

Referring now to FIG. 5, another aspect of this disclosure is illustrated. More specifically, the plurality of interrupters 304 may be combined into interrupter groups 502. An interrupter group 502 may be an assembly of interrupters 304 that can be selectively coupled to the support rail 302 to be positioned there through. In the embodiment of FIG. 5, each of the interrupter groups 502 may be selectively coupled to the support rail 302 as desired. In this configuration, the user may select the ideal number of interrupter groups 502 to couple to the support rail 302 based on crop type and field conditions. In one non-exclusive example, only every other interrupter group 502 may be coupled to the support rail 302 to agitate the crop and the remaining interrupter groups 302 may be substantially smooth along the inner surface 406. Accordingly, this disclosure contemplates coupling any combination of interrupter groups 502 to the support rail 302 based on the field and crop conditions and the user's preference.

Any number of interrupters 304 may be coupled to each interrupter group 502. In one non-exclusive embodiment, there may be five interrupters 304 on each interrupter group 502. In another example, there may be four interrupters 304 in each interrupter group 502. Further still, other examples may have less than four interrupters 304 per interrupter group 502 while other have more than five interrupters 304 per interrupter group 502. Accordingly, any number of interrupters 302 are considered herein for an interrupter group 502.

Figure 6:
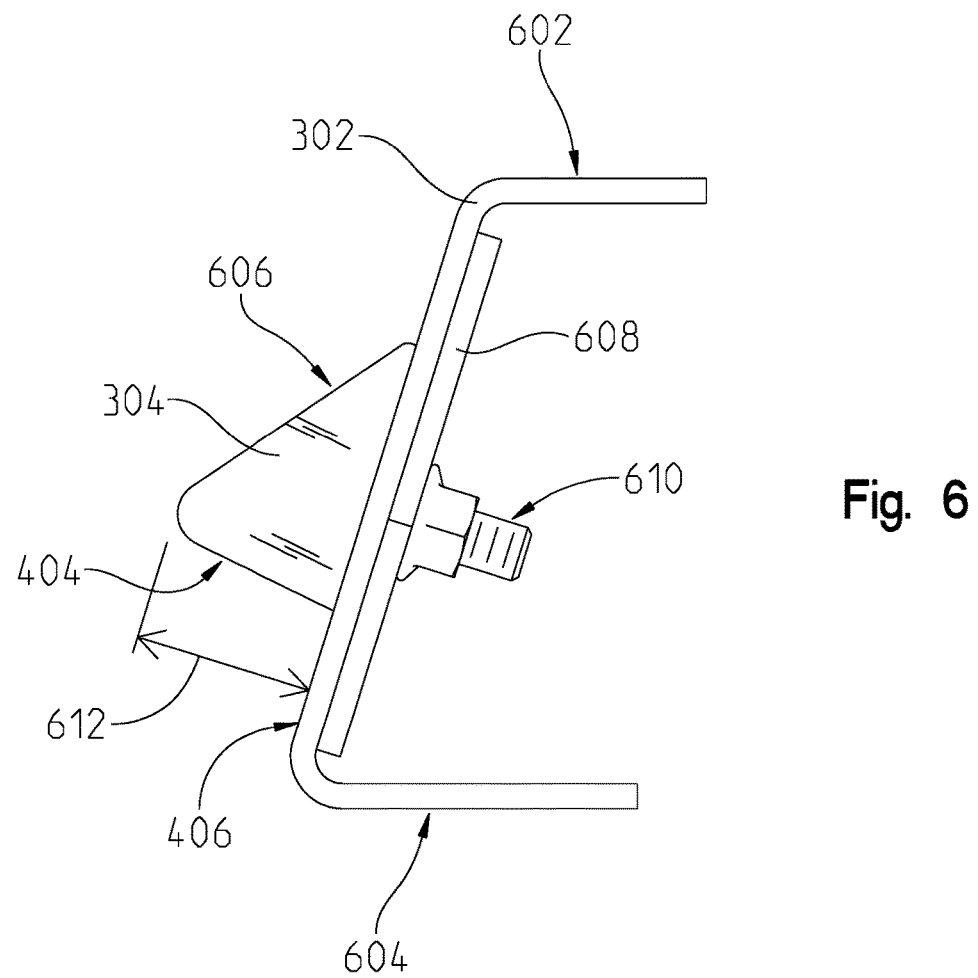
FIG. 6 is a side view of the support rail of FIG. 5.

In FIG. 6, a side view of the support rail 302 is illustrated. The support rail 302 may have a top side 602 that couples to the cover element 54 and a bottom side 604 that couples to the separating grate 48. The top and bottom side may have through holes or the like to allow a fastening mechanism, such as a bolt, to be positioned there through to couple the support rail 302 to the corresponding cover element 54 and separating grate 48. However, any known fastening means is considered herein. Further still, in one embodiment the support rail 302 is welded to the cover element 54 and separating grate 48.

Also illustrated in FIG. 6 is a trailing profile 606 of the interrupter 304. The trailing profile 606 may be a sloped edge of the interrupter 304 that extends from a base of the interrupter 304 to the leading face 404. While the leading face 404 is discussed herein as being about perpendicular relative to the inner surface 406, the trailing profile 606 may be sloped relative thereto when coupled to the support rail 302 as illustrated in FIG. 6. In this arrangement, any crop debris that is knocked loose above the interrupter 304 may fall more freely down towards the separating grate 48. In other words, while the leading face 404 is positioned to agitate crop as it flows in the counterclockwise direction 402, the trailing profile 606 may be tapered to allow crop material to more easily pass there over in the clockwise direction.

In one aspect of this disclosure, each interrupter group 502 may be a plurality of interrupters 304 extending from a base 608. The base 608 may be a substantially planar member that provides enough structural support to couple each interrupter 304 of the interrupter group 502 thereto. Further still, the base 608 may have one or more through hole defined therein that allows the base 608, and in turn the interrupter group 502, to be coupled to the support rail 302 via an interrupter receiver 610. The interrupter receiver 610 may be one or more fastener. However, any known method for coupling two components to one another is considered herein.

In another aspect of this disclosure, the interrupters 304 may have an interrupter length 612. The interrupter length 612 may be the length the leading face 404 extends radially inwards towards the rotation axis 212 past the inner surface 406. In one aspect of this disclosure, the interrupter length 612 may be varied for different interrupters 304 to accommodate different field and crop conditions. Further still, in one embodiment of this disclosure the positioning of the interrupter 304 relative to the inner surface 406 may be variable and in turn the interrupter length is variable as well.

Figure 7A:
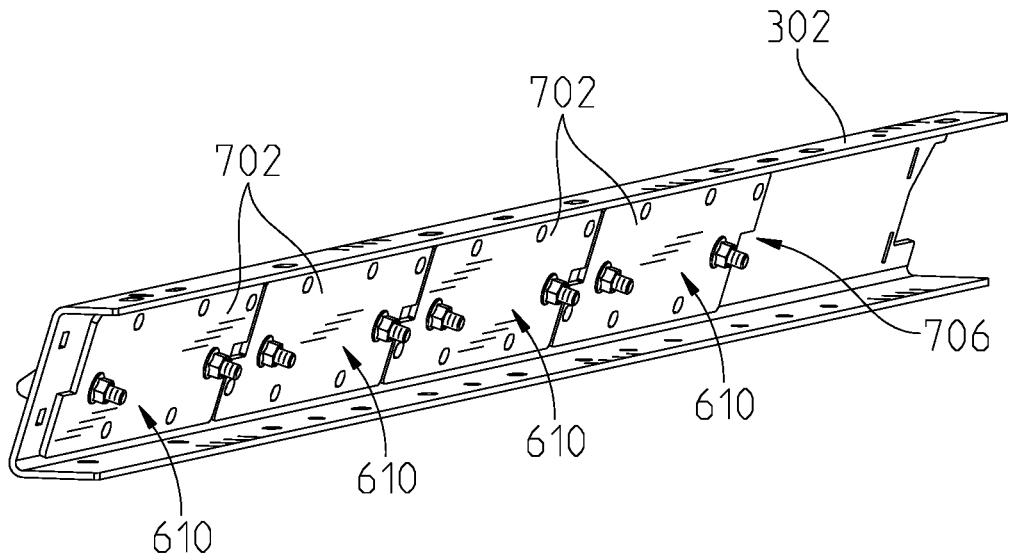
FIG. 7a is a back perspective view of the support rail of FIG. 5.
Figure 7B:
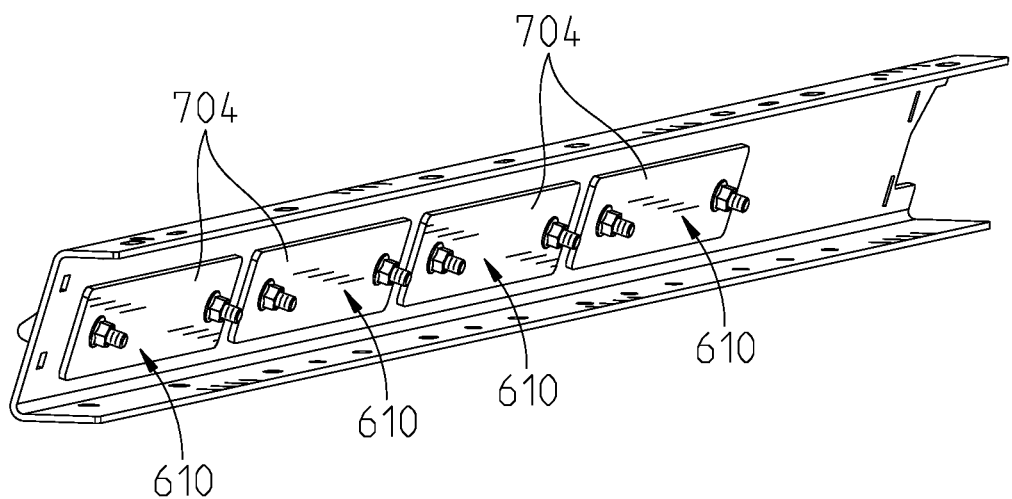
FIG. 7b is a back perspective view of another embodiment of a support rail.

In FIG. 7a, one embodiment of a base 702 is illustrated wherein the base 702 extends to cover substantially an entire back surface of the support rail 302. Further, the base 702 may have a notched end 706 wherein adjacent bases must be properly oriented to be positioned along the support rail 302 to be coupled to the receivers 610. Alternatively, FIG. 7b illustrates a base 704 that does not occupy the entire back surface of the support rail 302. Further still, the base 704 does not have a notched end and can be oriented as desired without regards to the orientation of the adjacent base 704.

Figure 8:
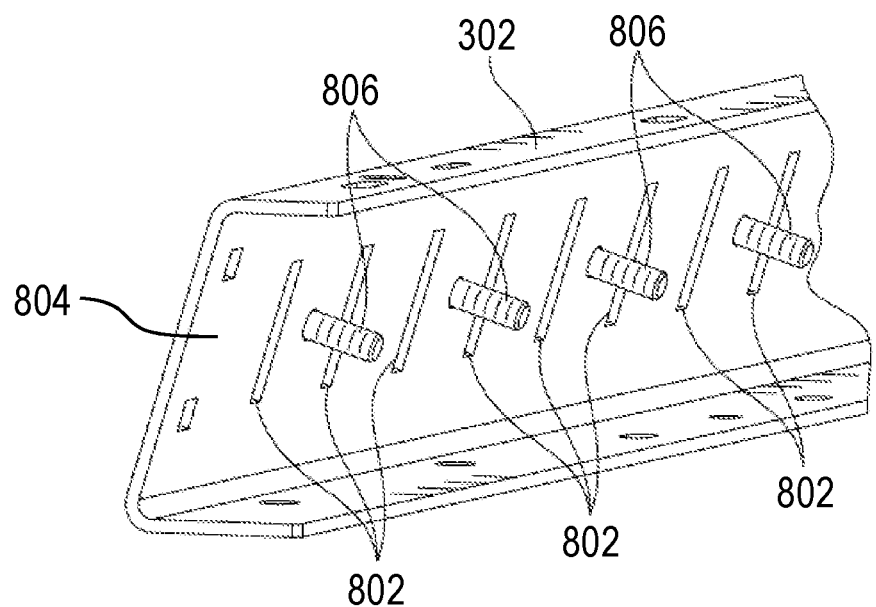
FIG. 8 is a back perspective view of a support rail with interrupters removed therefrom.

Referring now to FIG. 8, a back side of the support rail 302 is illustrated with all interrupters 304 removed therefrom. In one aspect of this disclosure, the support rail 302 may have a plurality of slots 802 defined there through. The slots 802 may be sized to allow a corresponding interrupter 304 to be positioned there through to extend from the inner surface 406 while the base 608 remains positioned along an outer surface 804. Also illustrated in FIG. 8 are couplers 806 extending from the outer surface 804. The couplers 806 may be one embodiment of the receivers 610 and correspond with the fasteners, such as nuts or the like, to selectively couple interrupter groups 502 thereto.

Figure 9:
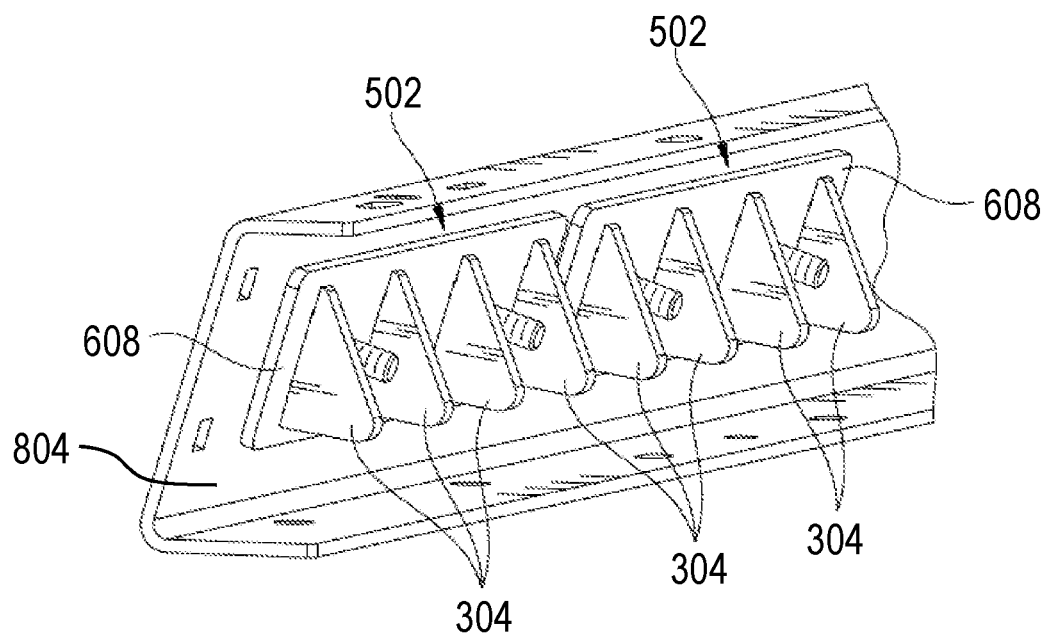
FIG. 9 is a back perspective view of the support rail of FIG. 8 with interrupters in a second orientation.

In FIG. 9, another aspect of this disclosure is illustrated. More specifically, the interrupter group 502 of FIG. 9 is illustrated oriented substantially 180 degrees opposite the embodiment illustrated in FIG. 6. That is to say, the interrupters 304 are not extending through the slots 802 but rather are extending away from the outer surface 804. In this configuration, the interrupters 304 may not be extending into the crop harvesting arrangement 26. Further still, the interrupter group 502 may still be coupled to the support rail 302 via the base 608. However, in this configuration that base 608 may act as a cover for the corresponding slots 802 to substantially block crop and debris from passing there through.

In one aspect of this disclosure, each interrupter group 502 may be coupleable to the rail 302 in either an interrupting configuration (see FIGS. 4-7) or in a smooth configuration (see FIG. 9). In the interrupting configuration, the interrupters 304 pass through the slots 802 radially inward of the inner surface 406 the interrupter length 612 to contact and agitate crop is it passes thereby. In the smooth configuration, the interrupters 304 may be oriented radially away from the outer surface 804 so crop may pass over the corresponding slots 802 without being substantially agitated. In one aspect of this disclosure, the couplers 806 may be spaced to receive the interrupter groups 502 in either the interrupting configuration or the smooth configuration. Further still, the interrupter groups 502 may be coupled to the support rail 302 in an alternating pattern between the interrupting and smooth configurations. In one aspect of this disclosure a user may orient the interrupter groups 502 in any possible combination of smooth and interrupting configurations to address the crop and field conditions.

Figure 10:
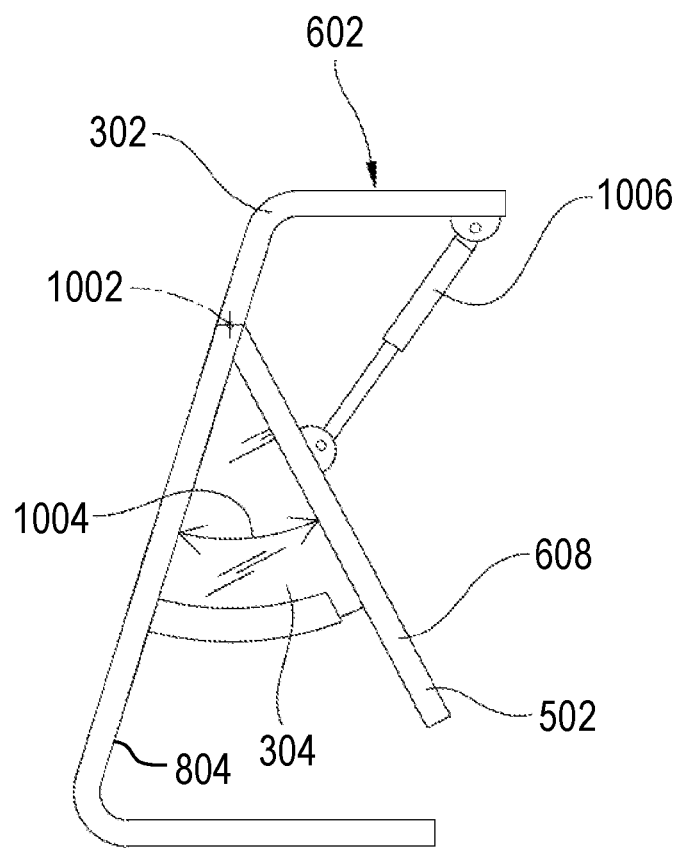
FIG. 10 is a side view of one embodiment wherein the interrupters are pivotally coupled to a support rail.

Another embodiment of this disclosure is illustrated in FIG. 10. The embodiment of FIG. 10 may utilize a similar support member 302 and interrupter groups 502 as discussed herein. However, in the embodiment of FIG. 10 the interrupter groups 502 may be pivotally coupled to the support member 302 at a pivot axis 1002. The pivot axis 1002 may be a hinge or any known mechanism for pivotally coupling two members to one another. Further, the pivot axis 1002 may allow the interrupter group 502 to pivot relative to the support member 302 between the interrupting configuration and the smooth configuration.

In the illustrative view of FIG. 10, the interrupter group 502 is in the smooth configuration. In the smooth configuration, an interrupter angle 1004 is defined between the outer surface 804 of the support member 302 and the base 608 of the interrupter group 502. Further, the interrupter angle 1004 may be about or greater than the angle of the trailing profile 606 relative to the base 608. In this orientation, the interrupters 302 may not extend substantially through the corresponding slots 802 and therefore not substantially contact crop and other debris in the crop harvesting arrangement 26.

Alternatively, the interrupter group 502 may pivot about the pivot axis 1002 until the interrupter angle 1004 is substantially zero. In other words, the interrupter group 502 may pivot about the pivot axis 1002 until the base 608 is substantially adjacent to the outer surface 804. In this orientation, the interrupters 304 extend through the corresponding slots 802 a maximum interrupter length 612 and are oriented in the interrupting configuration.

In one aspect of this disclosure, a solenoid 1006 or actuator may selectively pivot the interrupter group 502 relative to the support rail 302. More specifically, in one non-exclusive example the solenoid 1006 may be pivotally coupled to the top side 602 on one end and to the base 608 of the interrupter group 502 on the other end. In this configuration, the solenoid 1006 may be selectively engaged to alter the interrupter angle 1004. Each interrupter group 502 of the crop harvesting arrangement 26 may have a solenoid to control the interrupter angle 1004 of the interrupter group 502. Accordingly, in one aspect of this disclosure the interrupter angle 1004 of each interrupter group 502 may be independently controller to create a crop harvesting arrangement 26 that can efficiently harvest at a high capacity.

While the solenoid 1006 is discussed herein as transitioning the interrupter group 502 between the interrupting and smooth configurations, one embodiment utilizes an actuator instead of a solenoid 1006. The actuator may be hydraulic, pneumatic, or electric and capable of positioning the interrupter group 502 in any angular orientation there between. That is to say, the interrupter length 612 may be varied. In certain crop and field conditions the user may desire the interrupter angle 1004 to be any angle between the interrupting and smooth configurations. In this example, the actuator may move the interrupter group 502 until the corresponding interrupters 304 only partially extend through the corresponding slots 802.

In one aspect of this disclosure, the user may identify the crop and field conditions and orient the interrupter groups 502 in whatever configuration is ideal for the crops and field conditions. In the embodiment of FIGS. 6-9, the user may manually alter the interrupter groups 502 by selectively coupling the interrupter groups 502 to the corresponding interrupter receivers 610 in the desired orientation. Alternatively, in the embodiment of FIG. 10, the user may engage a user interface to select the desired orientation of the interrupter groups 502. The user interface may be in communication with a controller that controls the position of the solenoids 1006 to further alter the interrupter groups 502 as identified by the user interface. Accordingly, the teachings in this disclosure can be implemented in many different configurations depending on the capabilities of the combine 10 and the needs of the user.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A rotor assembly for harvesting a crop, comprising:
a rotating portion defined along a rotation axis;
a surrounding assembly at least partially surrounding the rotating portion, the surrounding assembly having at least one separation grate coupled to a support, where the support defines an inner surface and has a plurality of interrupter receivers positioned longitudinally along the support;
a first interrupter group comprising a base and at least one interrupter fixedly attached to the base, where the first interrupter group is configured to attach to any of the plurality of interrupter receivers;
wherein, when the first interrupter group is attached to a first interrupter receiver of the plurality of interrupter receivers then the at least one interrupter is located in a first position longitudinally along the support, and when the first interrupter group is attached to a second interrupter receiver of the plurality of interrupter receivers then the at least one interrupter is located in a second position longitudinally along the support, where the second position is different than the first position; and
further wherein, when the first interrupter group is attached to the first or second interrupter receiver in a first orientation then the at least one interrupter extends radially inward of the inner surface towards the rotation axis.

2. The rotor assembly of claim 1, further wherein each of the plurality of interrupter receivers includes a slot defined through the support, wherein when the first interrupter group is attached to any one of the plurality of interrupter receivers in the first orientation then the at least one interrupter extends through the slot of the one interrupter receiver.

3. The rotor assembly of claim 1, further wherein the at least one interrupter has a triangular or conical side profile.

4. The rotor assembly of claim 1, further wherein the base of the first interrupter group is moveably coupled to one of the plurality of interrupter receivers, such that movement of the base of the first interrupter group relative to the one of the plurality of interrupter receivers moves the interrupter between a limited exposure position wherein the interrupter does not extend past the inner surface of the support towards the rotating portion and a full exposure position wherein the interrupter extends past the inner surface towards the rotating portion.

5. The rotor assembly of claim 4, further comprising a solenoid that movably attaches the base of the first interrupter group to the one of the plurality of interrupter receivers.

6. The rotor assembly of claim 1, further wherein when the interrupter group is attached to the first or second interrupter receiver in a second orientation then the at least one interrupter of the interrupter group extends radially outward away from the rotation axis.

7. The rotor assembly of claim 2, further wherein each of the plurality of interrupter receivers includes a slot defined through the support, wherein when the interrupter group is attached to any of the plurality of interrupter receivers in a second orientation then the at least one interrupter does not extend through the slot.

8. The rotor assembly of claim 1, further comprising a plurality of interrupter groups where the first interrupter group is one of the plurality of interrupter groups, each of the plurality of interrupter groups comprising a base and at least one interrupter fixedly attached to the base;
wherein each of the plurality of interrupter groups is attached to one of the plurality of interrupter receivers.

9. The rotor assembly of claim 8, wherein the base of each of the plurality of interrupter groups includes a notch that limits the orientation of a first adjacent interrupter group relative to a second adjacent interrupter group when the first and second adjacent interrupter groups are attached to adjacent interrupter receivers of the plurality of interrupter receivers.

10. The rotor assembly of claim 8, wherein each of the plurality of interrupter receivers includes a first attachment point and a second attachment point positioned adjacent to one another longitudinally along the support; and attachment of a particular interrupter group of the plurality of interrupter groups to a particular interrupter receiver of the plurality of interrupter receivers requires attachment of the base of the particular interrupter group to both the first and second attachment points of the particular interrupter receiver.

11. The rotor assembly of claim 8, wherein each of the plurality of interrupter groups includes a plurality of interrupters fixedly attached to the base of the interrupter group.

12. The rotor assembly of claim 8, wherein for each of the plurality of interrupter groups attached to one of the plurality of interrupter receivers in the first orientation, the plurality of interrupters extend radially inward of the inner surface towards the rotation axis; and
wherein for each of the plurality of interrupter groups attached to one of the plurality of interrupter receivers in a second orientation, the plurality of interrupters extend radially outward of the inner surface away from the rotation axis.

13. A harvested crop processing arrangement, comprising:
a support rail defining an inner surface, where the support rail includes a plurality of interrupter receivers positioned longitudinally along the support rail;
at least one grate coupled to the support rail at least partially about a rotation axis; and
an interrupter coupled to the support rail, where the interrupter is configured to attach to any of the plurality of interrupter receivers;
wherein, when the interrupter is coupled to a first interrupter receiver of the plurality of interrupter receivers then the at interrupter is located in a first position longitudinally along the support, and when the interrupter is coupled to a second interrupter receiver of the plurality of interrupter receivers then the interrupter is located in a second position longitudinally along the support, where the second position is different than the first position; and
wherein, when the interrupter is coupled to the support rail in a first orientation then at least a portion of the interrupter extends radially inward towards the rotation axis and past the inner surface of the support rail.

14. The crop processing arrangement of claim 13, further wherein when the interrupter is coupled to the support rail in a second orientation then the interrupter extends radially outward away from the rotation axis and the inner surface.

15. The crop processing arrangement of claim 13, further wherein the interrupter has a leading face that is substantially perpendicular to the inner surface when the interrupter is in the first orientation.

16. The crop processing arrangement of claim 15, further wherein the interrupter has a trailing profile that extends from the leading face to the inner surface, wherein the trailing profile is not perpendicular to the inner surface.

17. The crop processing arrangement of claim 13, further comprising a solenoid that couples the interrupter to the support rail, wherein the solenoid is configured to move the interrupter towards and away from rotation axis when the interrupter is in the first orientation.

18. A crop harvesting machine, comprising:
at least one ground engaging mechanism coupled to a frame;
a cutting head coupled to the frame and configured to cut crop from an underlying surface;
a crop processing arrangement coupled to the frame through a plurality of support sections, the crop processing arrangement further comprising:
a rail having a top side, bottom side, inner surface, and outer surface, the rail extending between two adjacent support sections, and the rail including a plurality of slots that extend between the inner and outer surfaces of the rail;
a cover coupled to the rail along the top side of the rail;
a grate coupled to the rail along the bottom side of the rail;
a rotor rotationally coupled to the crop harvesting machine along a rotation axis and positioned at least partially between the cover and the grate; and
a first interrupter group coupled to the rail between the top side and the bottom side, the first interrupter group comprising a first base and a first plurality of interrupters fixedly attached to the first base;
wherein, when the first base of the first interrupter group is coupled to the rail in a first orientation then the first plurality of interrupters of the first interrupter group extend through the plurality of slots in the rail to extend radially inward towards the rotation axis past the inner surface.

19. The crop harvesting machine of claim 18, further comprising:
a second interrupter group coupled to the rail between the top side and the bottom side, the second interrupter group comprising a second base and a second plurality of interrupters fixedly attached to the second base;
wherein, when the second base of the second interrupter group is coupled to the rail in the first orientation then the second plurality of interrupters of the second interrupter group extend through the plurality of slots in the rail to extend radially inward towards the rotation axis past the inner surface; and
wherein, both the first base of the first interrupter group and the second base of the second interrupter group are also configured to couple to the rail in a second orientation where none of the first and second plurality of interrupters extend through the plurality of slots in the rail.

20. The crop harvesting machine of claim 19, further comprising:
a first solenoid that couples the first base of the first interrupter group to the rail; and
a second solenoid that couples the second base of the second interrupter group to the rail;
wherein when the first interrupter group is in the first orientation then the first solenoid is configured to move the first plurality of interrupters through the plurality of slots in the rail towards and away from rotation axis independent of the orientation or position of the second interrupter group; and
wherein when the second interrupter group is in the first orientation then the second solenoid is configured to move the second plurality of interrupters through the plurality of slots in the rail towards and away from rotation axis independent of the orientation or position of the first interrupter group.

* * * * *